United States Patent [19]

Tsuyuki et al.

[11] Patent Number: 4,787,292
[45] Date of Patent: Nov. 29, 1988

[54] BRAKE BOOSTER

[75] Inventors: Yasuo Tsuyuki; Haruo Suzuki; Hidefumi Inoue; Junichi Ohki, all of Saitama, Japan

[73] Assignee: Jidosha Kiki Co., Ltd., Tokyo, Japan

[21] Appl. No.: 97,803

[22] Filed: Sep. 16, 1987

[30] Foreign Application Priority Data

Sep. 29, 1986 [JP] Japan .............................. 61-149113[U]
Sep. 29, 1986 [JP] Japan .............................. 61-149114[U]
Oct. 20, 1986 [JP] Japan .............................. 61-160231[U]

[51] Int. Cl.⁴ .................................................. F15B 9/10
[52] U.S. Cl. ..................................... 91/369.3; 92/48; 91/376 R
[58] Field of Search ............. 91/369 A, 369 B, 369 C, 91/369 R, 376 R; 92/48, 49, 50, 99

[56] References Cited

U.S. PATENT DOCUMENTS 3,249,021 10/1963 Wuellner .
3,688,647 9/1972 Kyita ............................ 91/376 R X
3,958,497 5/1976 Gardner et al. ........................ 92/48
4,348,944 9/1982 Ochiai ................................ 91/369 C
4,394,832 7/1983 Weiler et al. ..................... 91/376 R
4,394,833 7/1983 Weiler et al. ..................... 91/376 R
4,512,237 1/1983 Endoh et al. .
4,567,812 2/1984 Weiler et al. ..................... 91/369 A
4,619,185 12/1984 Mori et al. .

FOREIGN PATENT DOCUMENTS 51-39314 10/1976 Japan .
56-10604 3/1981 Japan .
57-18552 1/1982 Japan .
57-107945 7/1982 Japan ............................... 91/369 C
58-164965 11/1983 Japan .
2095778 10/1982 United Kingdom ............. 91/369 C Primary Examiner—Robert E. Garrett
Assistant Examiner—Mark A. Williamson
Attorney, Agent, or Firm—Flynn, Thiel, Boutell & Tanis

[57] ABSTRACT

The invention relates to a locking arrangement for a key member used in a brake booster. A key member includes an arcuate portion which surrounds substantially one-half the perimeter of a valve body, and engaging recesses are formed at the opposite ends of the arcuate portion on the inner side. A retainer surrounds substantially one-half the perimeter of the valve body at a location opposite to the arcuate portion of the key member. The opposite ends of the retainer are formed with engaging pawls on the outer side for engaging with the engaging recesses under the resilience of the retainer. Accordingly, by merely assembling the key member and the retainer with the valve body, the engaging pawls of the retainer can be automatically engaged with the engaging recesses in the key member, thereby preventing the withdrawal of the retainer and the key member from the valve body.

7 Claims, 5 Drawing Sheets

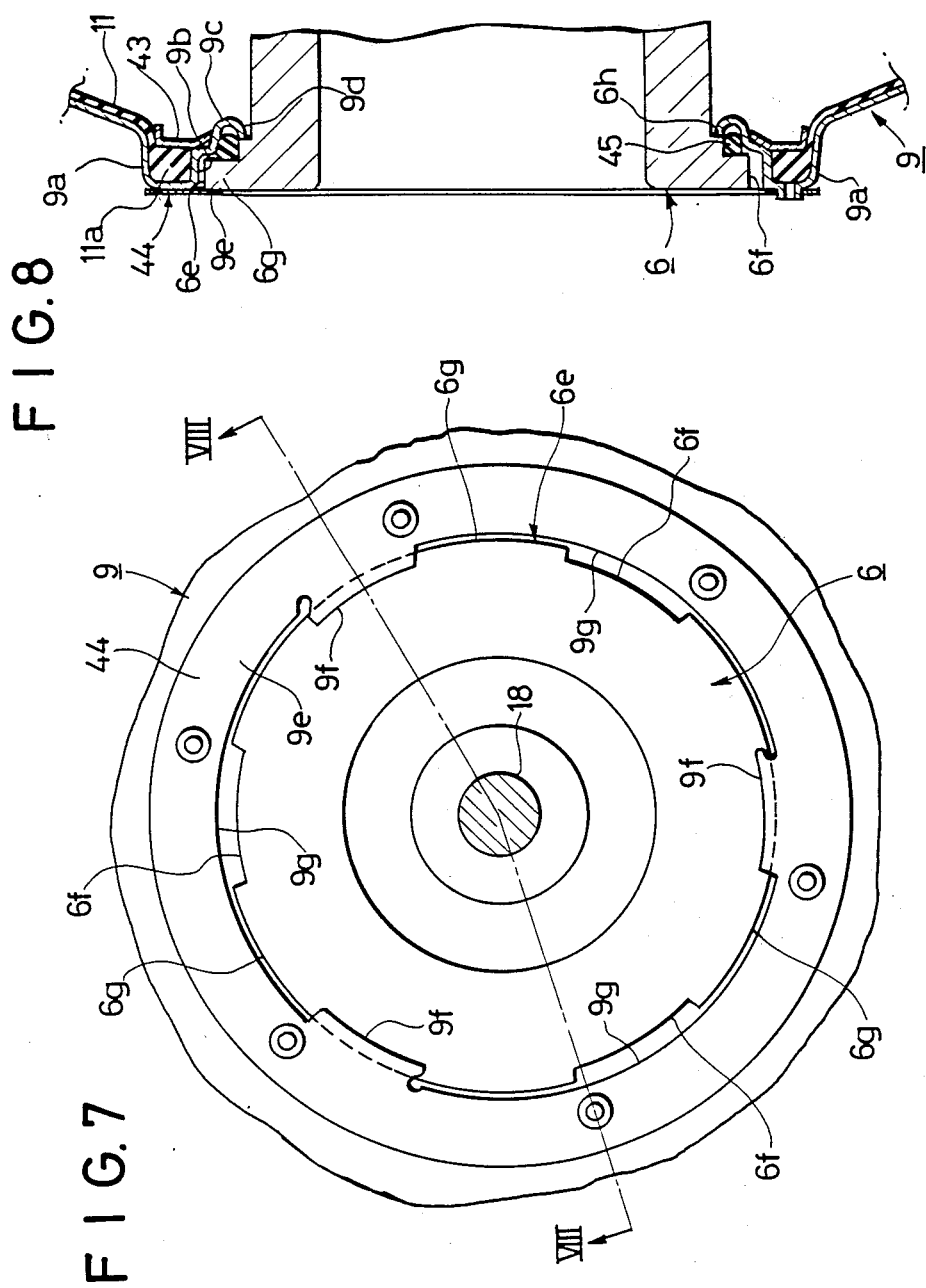

BRAKE BOOSTER

FIELD OF THE INVENTION

The invention relates to a brake booster, and more particularly, to a construction for preventing the withdrawal of a key member.

DESCRIPTION OF THE PRIOR ART

A brake booster is generally provided with a valve mechanism which is operated by an input shaft. A valve plunger, which forms part of the valve mechanism, is inserted into a bore formed within a valve body from a radially outer location, and is engaged with a key member which is effective to prevent the withdrawal of the valve plunger from the valve body. A locking device prevents the key member from being withdrawn from the bore.

A conventional locking device for the key member may comprise a locking portion which allows the key member to be inserted, from a radially outer location, into the bore formed in the valve body for engagement with the valve plunger and which prevents the withdrawal of the valve plunger from the valve body, and an arcuate portion of the key member which integrally extends from the locking portion substantially in surrounding relationship with the half perimeter of the valve body. In addition, a resilient retainer is provided around the valve body for surrounding substantially one-half the perimeter of the valve body at a location opposite to the arcuate portion. The opposite ends of the retainer are engaged with holes formed in the ends of the arcuate portion for connection with the key member, thus preventing the withdrawal of the key member from the bore (see Japanese Laid-Open Utility Model Application No. 164,965/1983).

However, a locking device constructed in the manner mentioned above requires a troublesome assembling operation since the opposite ends of the retainer must be separately engaged with holes formed in the ends of the arcuate portion.

SUMMARY OF THE INVENTION

In view of the foregoing, in a locking device comprising a key member including a locking portion and an arcuate portion constructed in the manner mentioned above, and a retainer which surrounds substantially one-half the perimeter of a valve body at a location opposite to the arcuate portion of the key member, the invention provides engaging recesses formed at the opposite ends of the arcuate portion of the key member on their inner side, and engaging pawls formed at the opposite ends of the retainer on their outer side for engagement with the engaging recesses under the resilience of the retainer, thus preventing the key member and the retainer from being separated from each other in the radially outward direction of the valve body. In addition, the opposite axial ends of the retainer are held between a pair of stepped end faces formed on the valve body or between a stepped end face formed on the valve body and the key member, thus preventing the disengagement between the engaging recesses and the engaging pawls as a result of an axial displacement.

With this construction, fitting the key member and the retainer around the valve body is all that is required for their assembly. The resilience of the retainer is effective to cause the engaging pawls formed thereon to be engaged with the engaging recesses formed in the key member to thereby prevent them from being separated from each other in the radially outward direction. As compared with the conventional construction, the assembly is greatly facilitated.

In addition, an axial movement of the key member is limited by the holes in which the locking portions are inserted. Because an axial movement of the retainer is limited by the pair of stepped end faces formed on the valve body or by the combination of the stepped end face on the valve body and the key member, a relative movement of the both members in the axial direction which exceeds a given value to cause an axial disengagement of the engaging recesses from the engaging pawls is prevented.

Accordingly, the invention enables the disengagement of the key member from the valve body to be prevented in a greatly facilitated manner by merely fitting the key member and the retainer around the valve body.

Other objects, features and advantages of the invention will become apparent from the following description of several embodiments thereof with reference to the drawings.

BRIEF DESCRIPTION OF THE DRAWINGS

FIG. 7 is a cross section taken along the line VII—VII shown in FIG. 1;

FIG. 8 is a cross section taken along the line VIII—VIII shown in FIG. 7; and

DETAILED DESCRIPTION OF EMBODIMENTS

Figure 1:
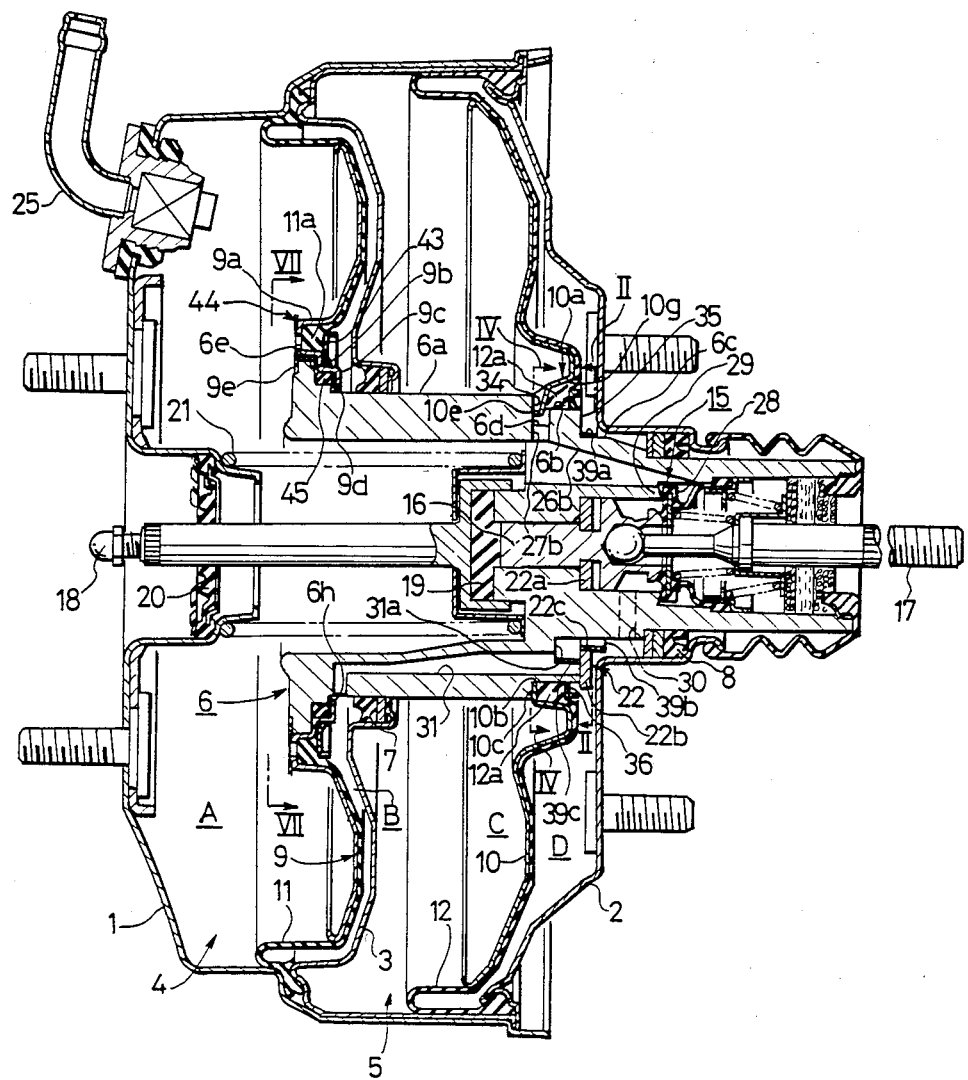
FIG. 1 shows one embodiment of the invention, and is a sectional view taken along the line I—I shown in FIG. 2.

Several embodiments of the invention as applied to a brake booster of tandem type will be described. Referring to FIG. 1, an enclosed vessel is defined by a front shell 1 and a rear shell 2, with a center plate 3 located centrally therein to divide the interior of the vessel into a front chamber 4 and a rear chamber 5 which are adjacent to each other in the fore-and-aft direction. A substantially cylindrical valve body 6 formed of a synthetic resin slidably extends through axial portions of the rear shell 2 and the center plate 3 and are hermetically sealed thereagainst by seal members 8 and 7, respectively.

A front power piston 9 and a rear power piston 10, which are disposed within the front chamber 4 and the rear chamber 5, respectively, are connected to the valve body 6, and a front diaphragm 11 and a rear diaphragm 12 are applied to the back surface of each power piston 9 or 10, whereby each of the front chamber 4 and the rear chamber 5 is divided into a pair of chambers by the respective diaphragms 11, 12, thus defining a total of four chambers A, B, C and D.

A valve mechanism 15 is received within the valve body 6 and includes a valve plunger 16 which is slidably fitted into the valve body 6, with the end of the valve plunger 16 being connected to an input shaft 17 which is mechanically coupled to a brake pedal, not shown. The front end of the valve plunger 16 is disposed in opposing relationship with the end face of a reaction disc 19 which is disposed in a right end of an increased diameter of a push rod 18, the other end of the push rod 18 slidably extending through an axial portion of the front shell 1, with a seal member 20 interposed therebetween to be mechanically coupled to the piston of a master cylinder, not shown.

The power pistons 9 and 10 and the valve body 6 are normally maintained in their inoperative positions shown by means of a return spring 21, and when these members are in such positions, a key member 22 which prevents the valve plunger 16 from being withdrawn from the valve body 6 bears against the inner surface of the rear shell 1 to restrict a free movement of the valve plunger 16 to the right relative to the valve body 6 so that whenever the input shaft 17 and the valve plunger 16 are operated subsequently, the valve mechanism 15 is immediately operative to switch a fluid circuit.

Specifically, in its free condition, the key member 22 is retracted from the valve body 6 with an increased spacing, securing an increased clearance between the valve element 28 and the valve seat 29 of the valve mechanism 15. However, in its inoperative condition, the key member bears against the internal surface of the rear shell 2 and thus is advanced with respect to the valve body 6, whereby it restricts a free retracting movement of the valve plunger 16 to maintain the clearance between the valve element 28 and the valve seat 29 at a small value or substantially zero so that it is capable of immediately switching the fluid circuit when the input shaft 17 and the valve plunger 16 are operated subsequently.

Figure 2:
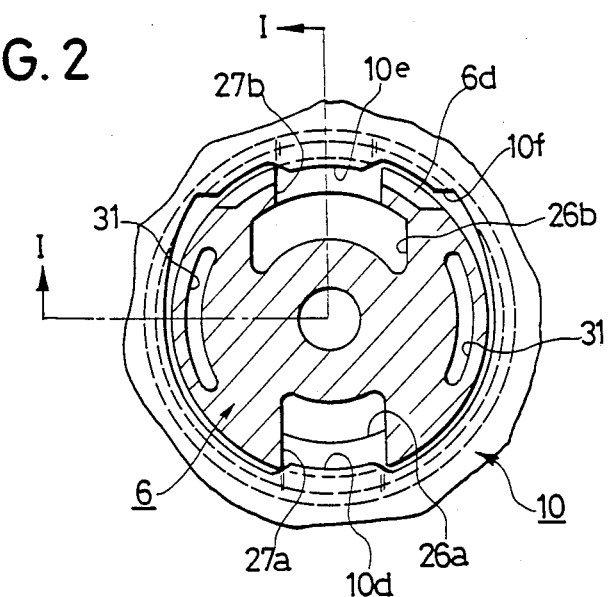
FIG. 2 is a cross section taken along the line II—II shown in FIG. 1.

The chamber A represents a constant pressure chamber into which a negative pressure is normally introduced, and communicates with an intake manifold, not shown, through a negative pressure introducing tube 25 which is mounted on the front shell 1. As shown in FIGS. 1 and 2, the constant pressure chamber A normally communicates with another constant pressure chamber C through a pair of axial passages 26a, 26b formed in the valve body 6 at vertically top and bottom positions, and through radial passages 27a and 27b which communicate with the axial passages.

When the brake booster is inoperative, these constant pressure chambers A and C communicate with a variable pressure chamber D through the axial passage 26b, a clearance between a valve element 28 and a valve seat 29 of the valve mechanism 15 and a radial passage 30 formed in the valve body 6, and thence with a variable pressure chamber B through an axial passage 31 formed in the valve body 6. Under such condition, a negative pressure is introduced into the respective constant pressure chambers A and C and the variable pressure chambers B and D to establish a balanced pressure condition, and since no pressure differential is developed across the diaphragm 4 or 5, these members are held in their inoperative positions shown by the return spring 21.

Around its outer peripheral surface, the cylindrical valve body 6 is formed with a large diameter portion 6a, a medium diameter portion 6b and a reduced diameter portion 6c in a sequential manner from its front towards its rear side as viewed in the direction of its operation. A first end face 34 is defined between the portions 6a and 6b, and the pair of radial passages 27a, 27b which provide a communication between the constant pressure chambers A and C open into the medium diameter portion 6b adjacent to such end face. In the present embodiment, these passages are utilized as a first engaging hole 27a and a second engaging hole 27b.

The axial portion of the rear power piston 10 is formed with an annular bulge 10a which projects axially forward, and the projecting end is then turned inwardly to define a fitting hole 10b through which the medium diameter portion 6b of the valve body 6 extends. An outer portion 10c adjacent to the fitting hole 10b is disposed in abutment against the first end face 34 for enabling a forward drive which is applied to the rear power piston 10 to be transmitted to the valve body 6 when a pressure differential is developed between the chambers C and D.

Figure 3:
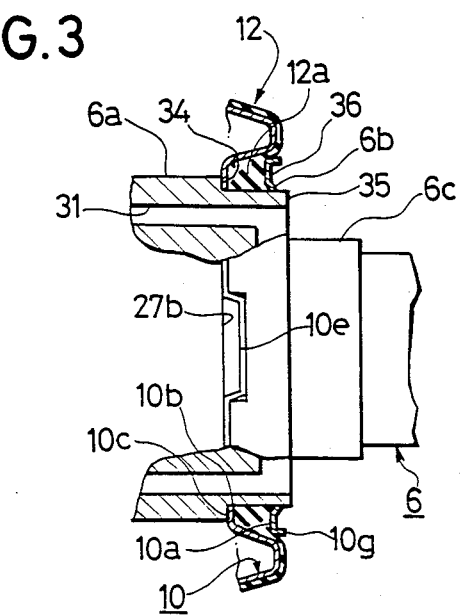
FIG. 3 is a fragmentary plan view, partly in section, of the arrangement shown in FIG. 1.

At diametrically opposite positions around the inner periphery of the fitting hole 10b, the rear power piston 10 is formed with a first engaging projection 10d and a second engaging projection 10e which extend radially inward beyond the outer peripheral surface of the medium diameter portion 6b for engagement with the respective engaging holes 27a and 27b, respectively. As shown in FIGS. 1 and 3, each of the engaging projections 10d and 10e extends rearward of the outer portion 10c of the rear power piston 10 along the profile of the respective engaging holes 27a, 27b, thereby preventing these engaging projections 10d and 10e from blocking the engaging holes 27a, 27b which should function as passages and simultaneously allowing the engaging projections 10d, 10e to be brought into abutment against the rear end face of the respective engaging holes 27a and 27b to prevent a rearward movement of the rear power piston 10 with respect to the valve body 6 when the rear power piston 10 is urged rearward with respect to the valve body 6.

As shown in FIG. 2, relieves 6d, 10f are formed in the outer portion 10c of the rear power piston 10 and the outer peripheral surface of the valve body 6 to permit the axis of the rear power piston 10 to be disposed eccentric downwardly, as viewed in FIG. 2, with respect to the axis of the valve body 6. When the rear power piston 10 is disposed eccentrically by utilizing the both relieves 6d, 10f, the second engaging projection 10e may be inserted further deeply into the second engaging hole 27b, permitting the other or the first engaging projection 10d to be further spaced from the outer peripheral surface of the valve body 6.

When the rear power piston 10 is skewed under such condition, the first engaging projection 10d may be moved past a second end face 35 defined between the medium diameter portion 6b and the reduced diameter portion 6c to the rear side thereof. In other words, the size of the relieves 6d and 10f and the axial length of the medium diameter portion 6b of the valve body 6 are dimensioned to permit the first engaging projection 10d to move past the second end face 35 under the condition mentioned above.

With the described construction, when the rear power piston 10 is assembled with the valve body 6, the reduced diameter portion 6c of the valve body 6 is initially fitted into the fitting hole 10b in the rear power piston 10. Because the spacing between the free ends of the engaging projections 10d, 10e formed along the fitting hole 10b is less than the external diameter of the medium diameter portion 6b of the valve body 6 when the axis of the valve body 6 is aligned with the axis of the rear power piston 10, it is impossible to fit the medium diameter portion 6b of the valve body 6 into the fitting hole 10b in the rear power piston 10.

Accordingly, while maintaining the first engaging projection 10d located to the right of the second end face 35 or rearwardly thereof, the rear power piston 10 is skewed to position the second engaging projection 10e over the second engaging hole 27b while bringing the rear power piston 10 to an upwardly eccentric position as viewed in FIG. 1. Subsequently, the rear power piston 10 is brought to its downward eccentric position as viewed in FIG. 1 while maintaining its skewed position to insert the second engaging projection 10e deep into the second engaging hole 27b.

Under this condition, since the relieves 6d, 10f are formed in the rear power piston 10 and the valve body 6, it is possible, by inserting the second engaging projection 10e deep into the second engaging hole 27b, to move the first engaging projection 10d, which is located rearward of the second end face 35, radially outward of the valve body 6 to a position where it is capable of moving past the second end face 35.

Thereupon, the rear power piston 10 is deskewed and the axis of the valve body 6 is aligned with the axis of the rear power piston 10, engaging the first engaging projection 10d with the first engaging hole 27a and bringing the outer portion 10c of the rear power piston 10 into abutment against the first end face 34.

Additionally, by forming the annular bulge 10a which projects forwardly in the axial portion of the rear power piston 10, there is left an annular recess 10g rearwardly of the annular bulge 10a, in which the inner periphery 12a of the rear diaphragm 12 is fitted. Additionally, a retainer 36 may be a press fit onto the medium diameter portion 6b of the valve body 6 and secured therein in order to prevent the withdrawal of the inner periphery 12a, whereby the rear power piston 10 is centered on the axis of the valve body 6 by the inner periphery 12a of the rear diaphragm 12.

Under this condition, if the rear power piston 10 is forced backward with respect to the valve body 6 as for air venting purpose, the force of the retracting rear power piston 10 can be supported by rear portions of the engaging holes 27a, 27b in the valve body 6 against which the engaging projections 10d, 10e abut and which are located forwardly of the inner periphery 12a of the rear diaphragm 12, thus facilitating the achievement of the required strength of related parts. As a consequence, the wall thickness of parts which are located rearward of such region may be reduced, permitting a reduction in the axial size.

Alternatively, the inner periphery 12a of the rear diaphragm 12 may be engaged with an annular groove formed in the valve body 6, thus allowing the retainer 36 to be dispensed with. Even in this instance, parts located rearward of the annular groove are not subject to the force of the retracting rear power piston 10, again allowing a reduction in the wall thickness of such parts and consequently a reduction in the axial size.

The engaging holes 27a and 27b are used as fluid passages in the described embodiment, but alternatively devoted engaging holes may be formed. In such instance, the axial size of the engaging holes may be chosen to be substantially coincident with the wall thickness of the rear power piston 10, thus allowing the extension of the engaging projections 10d, 10e rearward of the outer portion 10c in the described embodiment to be dispensed with.

The same is true when the present arrangement is applied to a single brake booster which requires no communication between the constant pressure chambers A and C or which requires no fluid passages.

Figure 4:
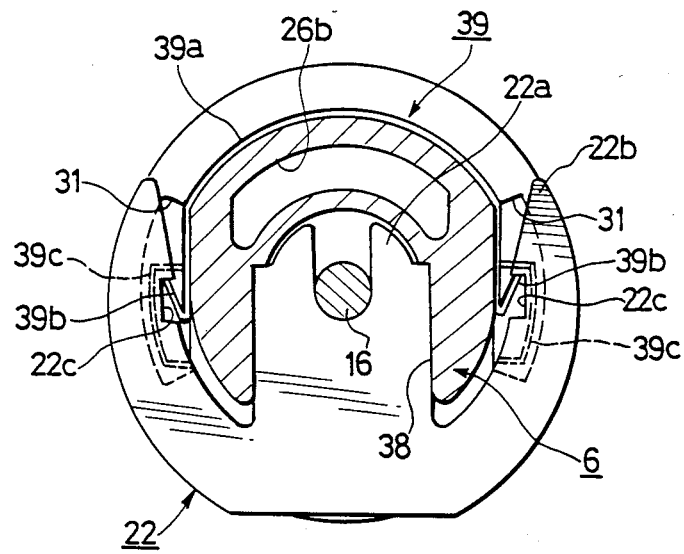
FIG. 4 is a cross section taken along the line IV—IV shown in FIG. 1.
Figure 5:
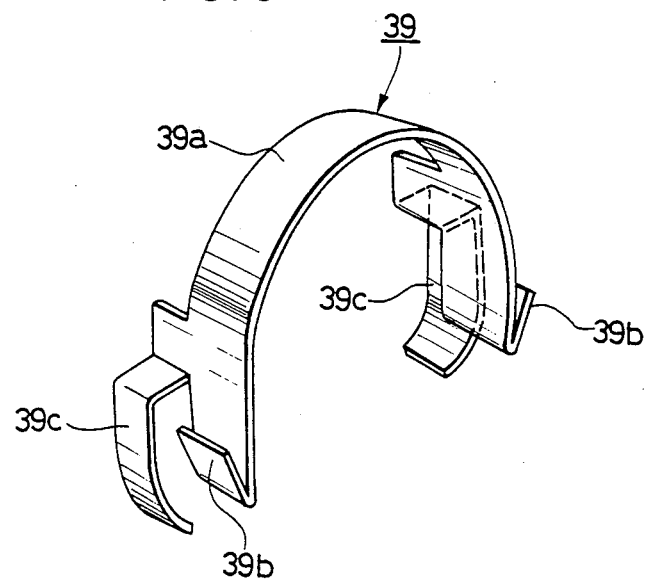
FIG. 5 is a perspective view of a retainer 39.

Referring to FIG. 4, the key member 22 which prevents the withdrawal of the valve plunger 16 from the valve body 6 includes a locking portion 22a which is adapted to be inserted into a radial bore 28, formed in the valve body 6, from the outside to prevent the withdrawal of the valve plunger 16 from the valve body 6, a pair of arcuate portions 22b which integrally and contiguously extend from the outer ends of the portion 22a and extend around substantially the half circumference of the valve body 6, and engaging recesses 22c formed inside of the arcuate portions 22b adjacent to the opposite ends thereof.

By contrast, a retainer 39 which prevents the withdrawal of the key member 22 from within the bore 38 comprises an arcuate body 39a which extends around substantially one-half the circumference of the valve body 6 in a region opposite to the arcuate portions 22b of the key member 22, and a pair of engaging pawls 39b which are defined by the opposite ends of the arcuate body 39a by folding them back to the outside. Each of the engaging pawls 39b is engageable with the recess 22c by its own resilience. Each engaging pawl 39b has an axial width which is chosen to prevent a disengagement of the key member 22 from the valve body 6 if the key member 22 moves through a given distance axially with respect to the valve body 6.

The opposite ends of the arcuate body 39a of the retainer 39 is formed with a pair of abutments 39c which are axially displaced or offset from the engaging pawls 39b so that each of the abutments 39c projects radially outward along an arcuate path from each end of the arcuate body 39a to a point which goes beyond the engaging pawl 39b. Each abutment 39c is dimensioned so as to be received within an opening of an axial passage 31 formed in the valve body 6, which is located toward the variable pressure chamber D. In addition, it has a width which is chosen so that its end face which is remote from the engaging pawl 39b is located adjacent to a stepped end face 31a formed inside the axial passage 31 when the retainer 39 is assembled in position within the valve body 6, thus allowing the combination of the stepped end face 31a and the key member 22 to hold the retainer 39 sandwiched therebetween from the axially opposite sides.

Accordingly, when the key member 22 and the retainer 39 are to be assembled, the arcuate body 39a of the retainer 39 is initially fitted around the periphery of the valve body 6 which is located remote from the opening of the bore 38, with the abutments 39c located on the opposite ends of the retainer 39 being received within the axial passage 31 to abut against or located close to the stepped end face 31a.

Subsequently, the locking portion 22a of the key member 22 is then inserted into the bore 38 from the opposite side until its extremity is engaged by the valve plunger 16, and the engaging pawls 39b of the retainer 39 may then be engaged with the recesses 22c formed inside the arcuate portions 22b adjacent to their opposite ends, thus completing the assembly.

Under this condition, the key member 22 and the retainer 39 cannot be separated away from each other in the radially outward direction, as a result of the engagement between the engaging recesses 22c and the engaging pawls 39b. Since the axial movement of the key member 22 is limited to a given value by the bore 38 in which the portion 22a is inserted, and since the axial movement of the abutments 39c of the retainer 39 is also limited to a given value as a result of their being held between the stepped end faces 31a formed in the valve body 6 and the arcuate portions 22b of the key member 22, a disengagement between the engaging recesses 22c and the engaging pawls 39b as a result of the axial movement relative to each other of these members beyond a required amount is positively prevented.

Figure 6:
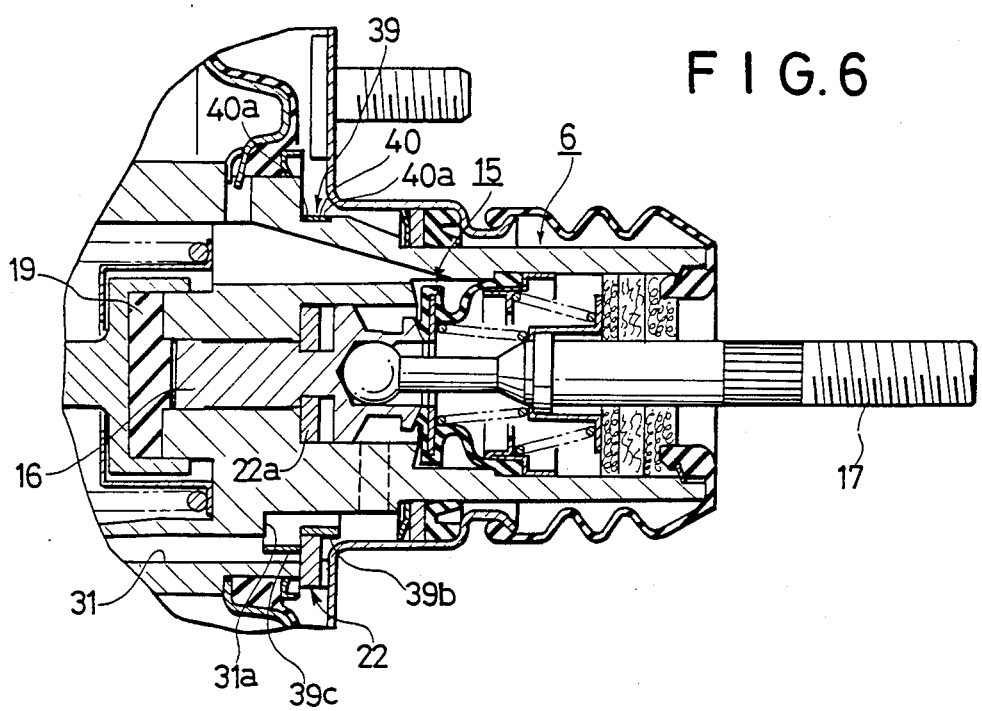
FIG. 6 is a sectional view of an essential part of another embodiment of the invention.

As an alternative arrangement, FIG. 6 shows an annular groove 40 formed around the periphery of the valve body 6, with an arcuate body 39a of the retainer 39 being fitted in the annular groove 40 and its opposite sides held between the stepped end faces 40a of the annular groove. In this instance, if the retainer 39 is formed with the abutments 39c, the combination of the abutments 39c and the annular groove 40 is effective to prevent the retainer from skewing as the key member 22 is axially displaced with respect to the valve body 6, in a favorable manner. If required, such abutments 39c may be eliminated.

In the embodiment described above, the valve body 6 and the front power piston 9 are coupled together by a bayonet or twist-lock coupling structure. Specifically, referring to FIGS. 1, 7 and 8, the forward end of the valve body 6, as viewed in the direction of its operation, is formed with a flange 6e around its outer periphery, and as indicated in FIG. 7, three first engaging recesses 6f are formed along the periphery of the flange 6e at circumferentially equal spacing, with a first engaging projection 6g being defined at a median position in each of the first engaging recesses 6f.

On the other hand, the inner periphery of the front power piston 9 is formed with a bulge 9a, which annularly bulges in a front direction, as viewed in the direction of operation thereof, and a portion which is contiguous with the bulge 9a is formed as a rear sidewall 9c which extends substantially radially inward and which is used to define an annular recess 9b in which the outer periphery of the flange 9e is to be received. Additionally, the inner end of the rear sidewall 9c is curved in a forward direction, as viewed in the direction of operation, in a cylindrical form, so that an abutment 9d is defined which is effective to bear against a stepped end face 6h formed along the outer periphery of the valve body 6 from the rear side, as viewed in the direction of operation.

In the embodiment described, the stepped end face 6h is located rearward of the flange 6e, as viewed in the direction of operation, but it should be understood that the end face of the flange 6e may be directly utilized. The front diaphragm 11 applied to the back surface of the front power piston 9 has its inner periphery 11a received within a recess defined on the back side of the bulge 9a and its withdrawal is prevented by a retainer 43.

An annular retainer 44 is mounted on the front end face of the bulge 9a, and its inner portion is formed as a front sidewall 9e which is located opposite to the rear sidewall 9c so that the combination of the rear sidewall 9c and the front sidewall 9e define the annular recess 9b. The front sidewall 9e is formed with a second engaging projection 9f which may pass through the first engaging recess 6f formed in the flange 6e and a second engaging recess 9g is formed at an median position within the second engaging projection 9f.

A seal member 45 is received within the annular recess 9b and is interposed between the rear sidewall 9c and the rear end face of the flange 6e so as to maintain a hermetic seal between the front power piston 9 and the valve body 6. Accordingly, the abutment 9d which is formed by curving the inner end of the rear sidewall 9c in the forward direction, as viewed in the direction of operation, into a cylindrical form will bear against the stepped end face 6h defined on the valve body 6 at a location radially inward of the seal member 45.

With the described arrangement, when the front power piston 9 is to be assembled with the valve body 6, the seal member 45 is initially fitted around the periphery of the valve body 6, positioning it in abutment against the rear end face of the flange 6e. The valve body 6 and the front power piston 9 are then rotated through a given angle and then both of them are moved axially to allow the first engaging projection 6g formed on the valve body 6 to pass through the second engaging recess 9g formed in the front power piston 9 and also allowing the second engaging projection 9f on the front power piston 9 to pass through the first engaging recess 6f in the valve body 6. Subsequently, the both members are rotated relative to each other so that the first engaging projection 6g and the second engaging projection 6f mutually engage each other.

Under this condition, the second engaging projection 9f on the front power piston 9 bears against the first engaging projection 6g on the valve body 6 from the front side and the abutment 9d on the front power piston 9 bears against the stepped end face 6h of the valve body 6 from the rear side, whereby the valve body 6 and the front power piston 9 are integrally coupled together.

When the valve body 6 and the front power piston 9 are coupled together in the manner mentioned above, a hermetic seal between the constant pressure chamber A and the variable pressure chamber B is maintained by the seal member 45 while a forwardly acting force which is caused by a fluid pressure differential across the front power piston 9 is transmitted to the valve body 6 through the abutment 9d on the front power piston 9.

Accordingly, as compared with the prior art arrangement in which the forwardly acting force of the front power piston 9 is transmitted to the valve body 6 at a location which is radially outward of the seal between the constant pressure chamber A and the variable pressure chamber B, the internal stress which is applied to the valve body 6 can be reduced, thus allowing a reduction in the size of the valve body 6 and hence in the axial size of the brake booster.

Figure 9:
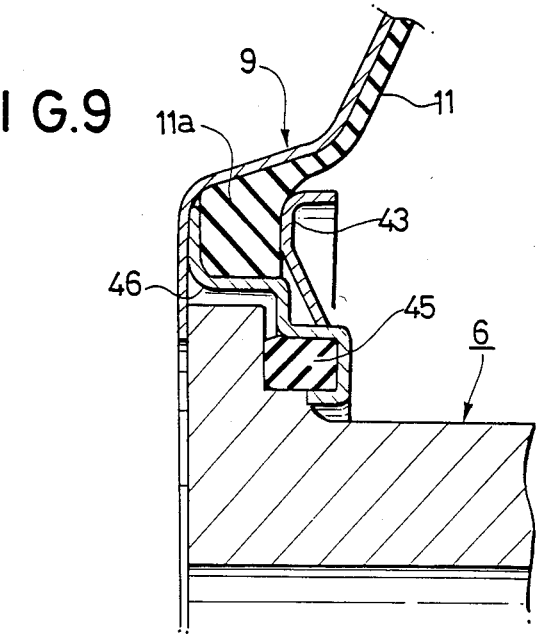
FIG. 9 is a fragmentary cross section of part of a further embodiment of the invention.

In the above embodiment, the retainer 44 is mounted on the front side of the front power piston 9 to define the annular recess 9b. However, as illustrated in FIG. 9, a retainer 46 may be mounted on the back surface of the front power piston 9 to define an annular recess. In addition, an annular recess may also be formed by erecting part of the front power piston 9.

In the described embodiment, the invention has been applied to the front power piston, but it should be understood that the invention is equally applicable to the rear power piston 10 or is also applicable to the power piston of a single brake booster.

What is claimed is:

1. A brake booster including a valve plunger slidably fitted in a valve body and forming part of a valve mechanism, a locking portion of a key member which is inserted into a bore formed within the valve body from a radially outer location for engagement with the valve plunger to prevent the withdrawal of the valve plunger from the valve body, an arcuate portion of the key member extending integrally from the locking portion and surrounding substantially one-half the perimeter of the valve body, and a retainer surrounding substantially one-half the perimeter of the valve body at a location opposite to the arcuate portion and having opposite ends which are connected to the arcuate portion to prevent the withdrawal of the key member from the bore;

characterized in that engaging recesses are formed at the opposite ends of the arcuate portion of the key member on the inner side while engaging pawls are formed at the opposite ends of the retainer on the outer side for engaging with the engaging recesses under the resilience of the retainer to prevent the key member and the retainer from being separated from each other in the radially outward direction of the valve body, the axially opposite ends of the retainer being held between a pair of stepped end faces formed on the valve body or between a stepped end face formed on the valve body and the key member, thereby preventing the disengagement between the engaging recesses and the engaging pawls as a result of an axial displacement, the retainer having an arcuate body, the opposite ends of which arcuate body are formed with abutments axially offset from the engaging pawls and which are received in recessed formed in the valve body.

2. A brake booster according to claim 1 in which the key member is displaceable in the axial direction of the valve body so that when the brake booster is inoperative, the key member abuts against an inner wall surface of a shell in which the valve body is received in a displaceable manner, the abutment being effective to restrict a free retracting movement of the key member with respect to the valve body to maintain the valve plunger of the valve mechanism at an advanced position with respect to the valve body while when the valve plunger is driven forward by an input shaft which is mechanically coupled to a brake pedal, a flow path within the valve mechanism can be immediately switched.

3. A brake booster according to claim 1 in which the outer periphery of the valve body is formed with a flange which is circumferentially provided with a first engaging projection and a first engaging recess, the inner periphery of a power piston which is mounted on the valve body being formed with an annular recess which is capable of receiving the flange therein, a front sidewall which defines the the annular recess being circumferentially formed with a second engaging projection and a second engaging recess, the valve body and the power piston being disposed at a given angle relative to each other and the both axially displaced to cause the first engaging projection to pass through the second engaging recess and to cause the second engaging projection to pass through the first engaging recess, whereupon the both are rotated relative to each other to cause the first engaging projection and the second engaging projection to engage each other, thus connecting the valve body and the power piston together, a seal member being interposed between a rear sidewall of the annular recess and the rear end face of the flange to maintain a hermetic seal between the power piston and the valve body, a rear sidewall which is located radially inward of the seal member being disposed for abutment against a stepped end face formed on the valve body, thereby allowing a thrust applied to the power piston to be transmitted to the valve body through the abutment.

4. A brake booster according to claim 3 in which the power piston comprises a front power piston of a tandem brake booster.

5. A brake booster according to claim 1 in which said abutments are arcuate and extend radially outward beyond the engaging pawls.

6. A brake booster including a valve plunger slidably fitted in a valve body and forming part of a valve mechanism, a locking portion of a key member which is inserted into a bore formed within the valve body from a radially outer location for engagement with the valve plunger to prevent the withdrawal of the valve plunger from the vile body, an arcuate portion of the key member extending integrally from the locking portion and surrounding substantially one-half the perimeter of the valve body, and a retainer surrounding substantially one-half the perimeter of the valve body at a location opposite to the arcuate portion and having opposite ends which are connected to the arcuate portion to prevent the withdrawal of the key member from the bore;

characterized in that engaging recesses are formed at the opposite ends of the arcuate portion of the key member on the inner side while engaging pawls are formed at the opposite ends of the retainer on the outer side for engaging with the engaging recesses under the resilience of the retainer to prevent the key member and the retainer from being separated from each other in the radially outward direction of the valve body, the axially opposite ends of the retainer being held between a pair of stepped end faced formed on the valve body or between a stepped end face formed on the valve body and the key member, thereby preventing the disengagement between the engaging recesses and the engaging pawls as a result of an axial displacement, the outer peripheral surface of the valve body including a large diameter portion, a medium diameter portion and a reduced diameter portion sequentially formed as viewed from the front to the rear as viewed in the direction of operation thereof, the medium diameter portion being formed with a first and a second engaging hole at opposing locations and adjacent to a first end face which is defined between the medium and the large diameter portion, a power piston being connected to the valve body and including a shank portion in which a fitting opening is formed through which the medium diameter portion of the valve body extends, the outer portion of the fitting opening being disposed for abutment against the first end face, a first and a second engaging projection being formed at opposing locations around the inner peripheral surface of the fitting opening and extending radially inward beyond the outer peripheral surface of the medium diameter portion for engagement with the respective engaging holes, the medium diameter portion of the valve body having an axial length which permits the second engaging projection to be located over the second engaging hole while maintaining the first engaging projection rearward of a second end face defined between the medium and the reduced diameter portion with the power piston skewed, at least one of the outer portion of the fitting opening in the power piston and the outer peripheral surface of the valve body being formed with a relief which permits the axis of the power piston to be disposed eccentric with respect to the axis of the valve body, the relief being effective to permit the power piston to be disposed eccentrically in a direction to permit the second engaging projection to be inserted deep into the second engaging hole while the power piston is skewed, such eccentricity permitting the first engaging projection to move forwardly beyond the second end face to be engaged with the first engaging hole, the respective engaging projections being disposed in contact with the rear end face of the respective engaging holes to block a retracting movement of the power piston with respect to the valve body.

7. A brake booster according to claim 6 in which the power piston comprises a rear power piston of a tandem brake booster.

* * * * *

UNITED STATES PATENT AND TRADEMARK OFFICE
CERTIFICATE OF CORRECTION

PATENT NO. : 4 787 292

DATED : November 29, 1988

INVENTOR(S) : Yasuo TSUYUKI et al

It is certified that error appears in the above-identified patent and that said Letters Patent is hereby corrected as shown below:

Col. 9, line 30; change "recessed" to ---recesses---.

Col 10, line 16; change "vile" to ---valve---.

Col 10, line 35; change "faced" to ---faces---.

Signed and Sealed this

Twenty-third Day of May, 1989

Attest:

DONALD J. QUIGG

*Attesting Officer*  *Commissioner of Patents and Trademarks*